(12) United States Patent
Lu (10) Patent No.: US 6,230,365 B1
(45) Date of Patent: May 15, 2001

(54) HINGE FOR A NOTEBOOK COMPUTER

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 0 days.

(21) Appl. No.: 09/481,127

(22) Filed: Jan. 11, 2000

(51) Int. Cl.[7] .............................. E05C 17/64; E05D 11/08
(52) U.S. Cl. .................................. 16/342; 16/16; 16/337; 16/371; 16/374; 16/312
(58) Field of Search ........................... 16/337, 342, 371, 16/374, 312, 313, 314; 439/31, 104; 361/681

(56) References Cited

U.S. PATENT DOCUMENTS

| | | | |
|---|---|---|---|
| 3,840,936 | * 10/1974 | Sato | 16/142 |
| 4,422,214 | * 12/1983 | Lautenschlager et al. | 16/379 X |
| 4,617,699 | * 10/1986 | Nakamura | 16/342 |
| 5,406,678 | * 4/1995 | Rude et al. | 16/342 |
| 5,522,656 | * 6/1996 | Jenkins | 16/344 X |
| 5,896,622 | * 4/1999 | Lu | 16/342 |
| 5,950,281 | * 9/1999 | Lu | 16/342 |
| 6,170,120 | * 1/2001 | Lu | 16/342 |

FOREIGN PATENT DOCUMENTS

| | | | | |
|---|---|---|---|---|
| 2234835 | * | 12/1974 | (DE) | 16/371 |
| 2511201 | * | 9/1976 | (DE) | 16/371 |
| 2001684 | * | 1/1978 | (DE) | 16/371 |

* cited by examiner

*Primary Examiner*—Lynne H. Browne
*Assistant Examiner*—Ernesto Garcia
(74) *Attorney, Agent, or Firm*—Thorp Reed & Armstrong (57) ABSTRACT

A hinge for a notebook computer is disclosed. The hinge is composed of a base and a hinge member pivotally mounted on the base by a pintle. The base has a pulley bracket pivotally mounted thereon and a pulley rotatably mounted on the bracket. A tongue is mounted on the pintle and can be pivoted with the hinge member. A distal end of the tongue is engaged with the pulley and located below the pulley when the computer is closed. When the computer is to be opened, the tongue is pivoted upwards to push the pulley bracket pivoted upwards, and disengaged from the pulley. When the computer is to be closed, the tongue is pivoted downwards to push the pulley bracket pivoted downwards, and located below the pulley again. Because the tongue is limited by the pulley, the pintle is unable to be freely rotated and the display is securely closed.

7 Claims, 8 Drawing Sheets

HINGE FOR A NOTEBOOK COMPUTER

BACKGROUND OF THE INVENTION

1. Field of the Invention

The present invention is related to a hinge for a notebook computer, and more particular to a hinge which can securely fasten a display on a body of the computer without a fastener when the computer is closed.

2. Description of Related Art

A conventional hinge used in a notebook computer only provides a function of positioning a display. The notebook computer generally must use a fastener or a lock member to attach the display on a body to prevent the display freely opening when the computer is closed.

Therefore, it is an objective of the invention to provide an improved hinge for a notebook computer to mitigate and/or obviate the aforementioned problem.

SUMMARY OF THE INVENTION

The main objective of the present invention is to provide a hinge for a notebook computer that can fasten a display on a body of the computer without a fastener when the computer is closed.

Other objects, advantages and novel features of the invention will become more apparent from the following detailed description when taken in conjunction with the accompanying drawings.

DETAILED DESCRIPTION OF THE PREFERRED EMBODIMENT

Figure 1:
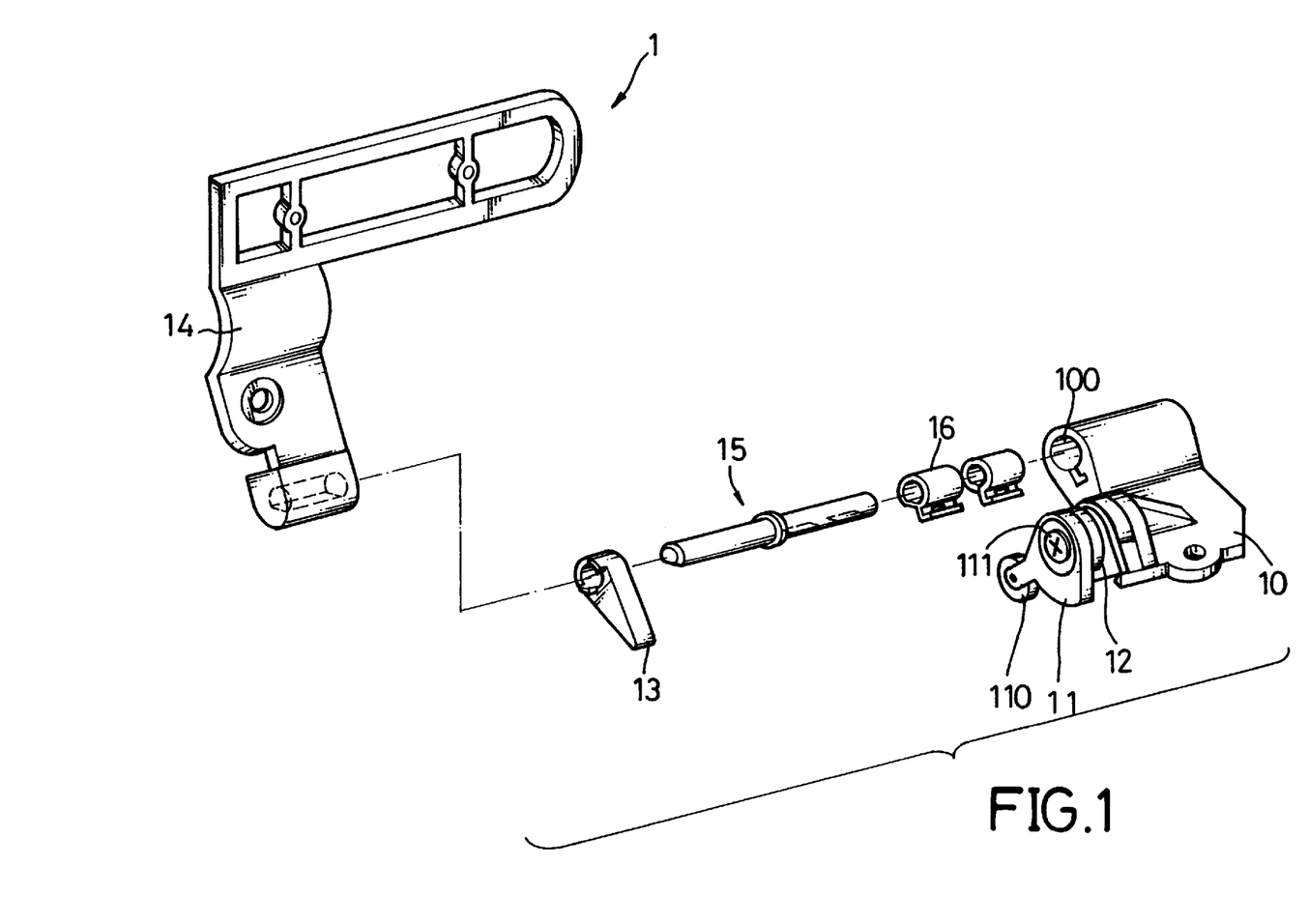
FIG. 1 is an exploded perspective view of a hinge in accordance with the invention.
Figure 7:
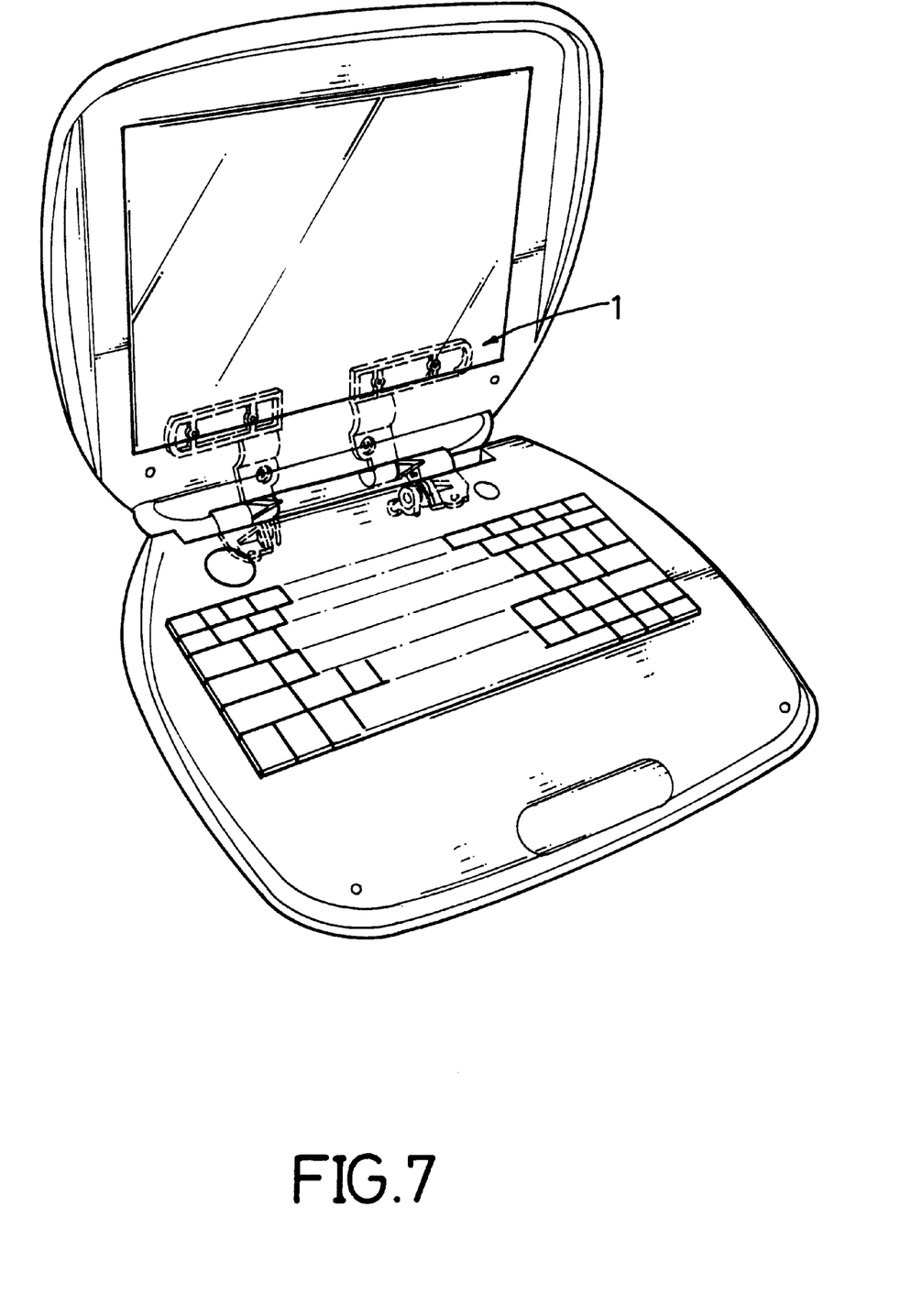
FIG. 7 is a perspective view showing the hinge assembled in a notebook computer.

Referring to FIG. 1, a hinge (1) in accordance with the present invention comprises a base (10) assembled in a body of a notebook computer and a hinge member (14) provided in a display of the computer to pivotally mount it on the body of the computer. The configuration of the hinge (1) assembled in the notebook computer is shown in FIG. 7.

The base (10) has a barrel defining a passage (100) therein. A slot (not numbered) is defined in communication with the passage (100) and axially extended along the passage (100). A pulley bracket (11) is pivotably mounted on the base (10) by a screw (111). A spring (12) is provided on the base (10) with an end mounted on the pulley bracket (11). A pulley (110) is rotatably mounted on the bracket (11). Axes of the passage (100), the bracket (11) pivoting about the base (10) and the pulley (110) are all parallel to each other.

Figure 3:
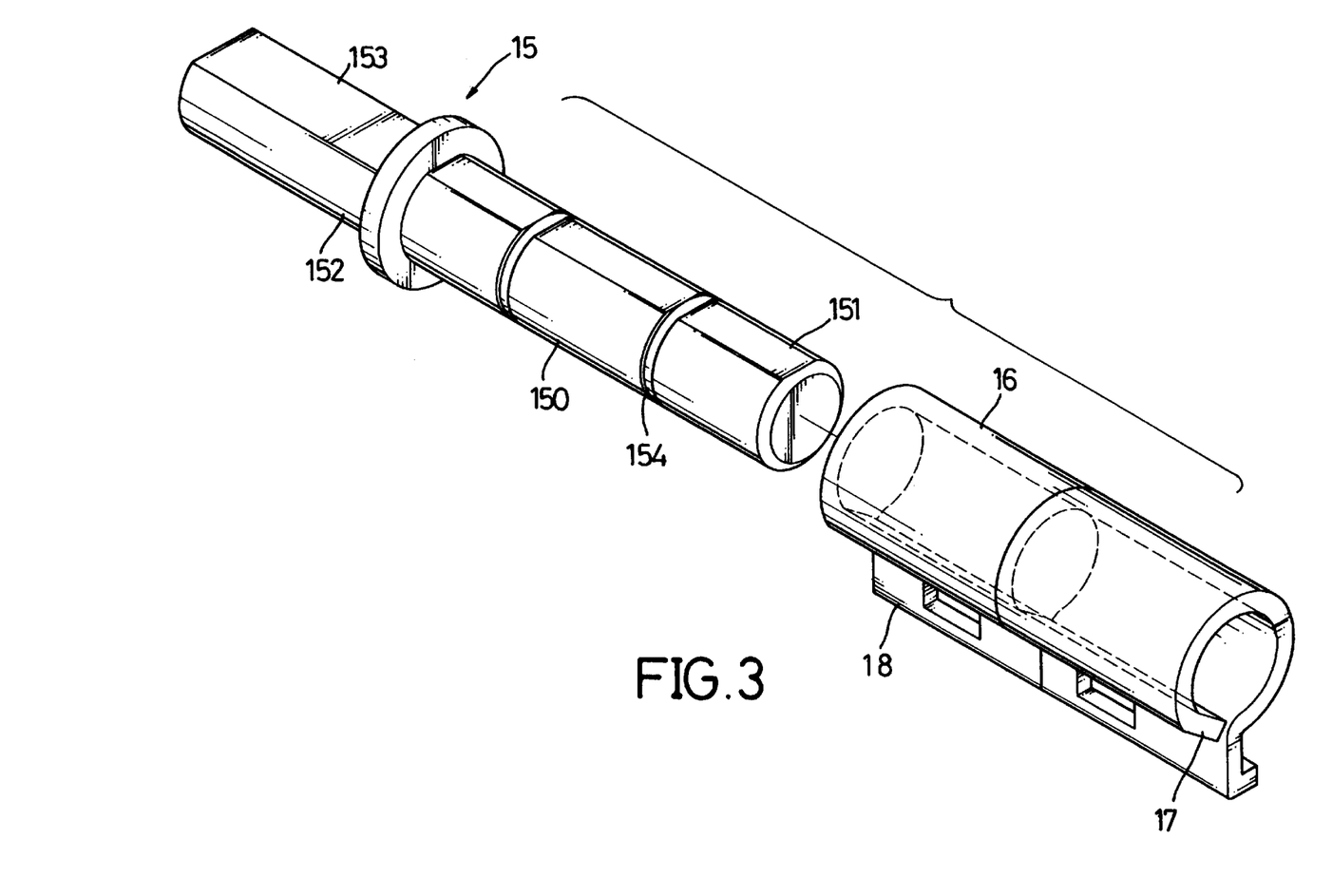
FIG. 3 is an exploded perspective view of a pintle and flexible sleeves of the hinge in accordance with the invention.

Referring to FIG. 3, a pintle (15) has a first section (150) received in the passage (100) of the base (10) and a second section (152) received in an opening (not numbered) of the hinge member (14) to engage the hinge member (14) with the base (10). A flange (not numbered) is formed between the first section (150) and the second section (152) to separate them. A plurality of lubrication grooves (154) are defined in an outer periphery of the first section (150) of the pintle (15).

At least one flexible sleeve (16) is provided in the passage (100). The first section (150) is rotatably received in the flexible sleeve (16). The flexible sleeve (16) has a cross-section substantially shaped as a question mark and includes a straight lower portion (18) and an upper portion shaped as an incomplete circle, whereby a gap is defined between a flat distal edge (17) of the upper portion and the lower portion (18). The passage (100) receives therein the upper portion of the flexible sleeve (16). The slot of the passage (100) receives therein the lower portion of the flexible sleeve (16) whereby the flexible sleeve (16) is prevented from rotating in the passage (100). Furthermore, the first section (150) has a first chamfer (151) axially formed along the outer periphery thereof and configured to matingly abut the flat distal edge of the sleeve (16). A distance from the first chamfer (151) to a diametrically opposite point of the first section of the pintle (15) is substantially equal to a distance from an inner face of the flat distal edge to an opposite inner point of the upper portion of the sleeve (16), whereby, as shown in FIG. 4b, the pintle (15) is secured in a first position in the sleeve (16) when the computer is closed. However, a diameter of the first section of the pintle (15) is greater than the distance from the inner face of the flat distal edge (17) to the inner point of the upper portion whereby, as shown in FIG. 4a, an interference fit is defined between the pintle (15) and the sleeve (16) in a second position when the computer is open.

Figure 2A:
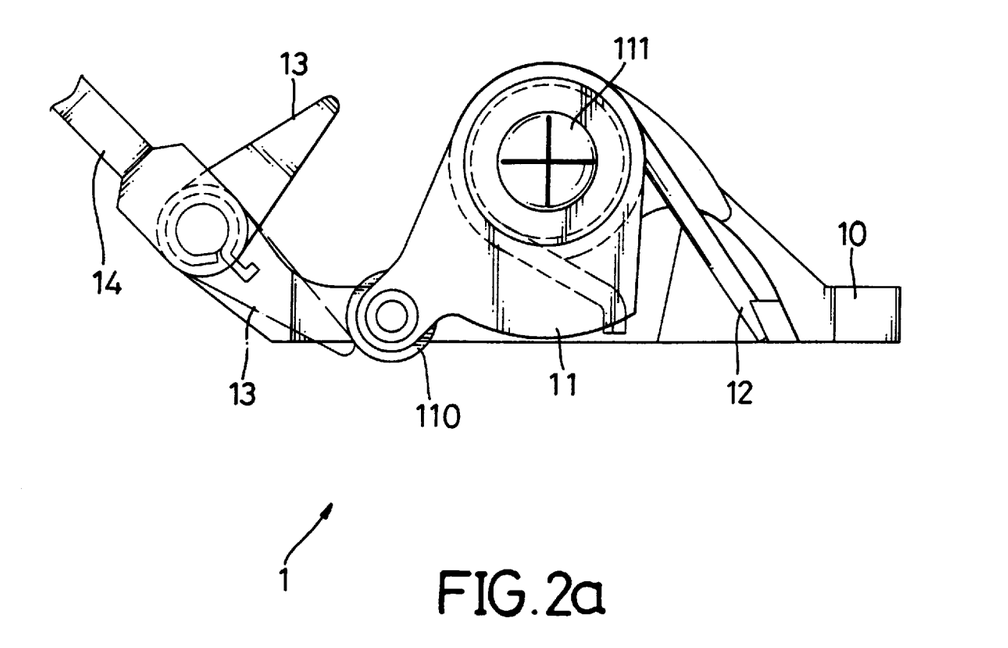
FIG. 2a is a partial schematic view showing the movement of a tongue in opening.
Figure 2B:
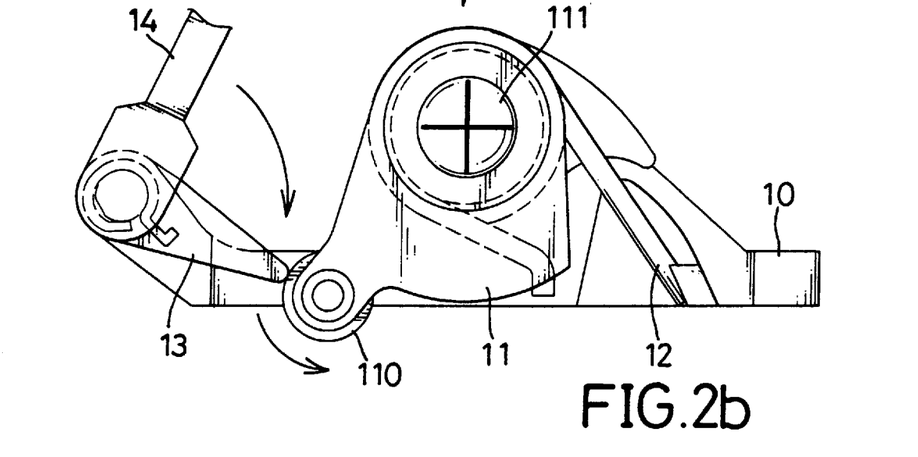
FIG. 2b is a partial schematic view showing the movement of a tongue in closing.

Referring back to FIG. 1, a tongue (13) is fixedly provided on the second section (152) of the pintle (15). A distal end of the tongue (13) is engaged with the pulley (110), as shown in FIG. 2b. The second section (152) also has a second chamfer (153) axially formed along an outer surface, as shown in FIG. 3. FIGS. 2a and 2b illustrate movement of the tongue (13) during opening and closing of the computer, respectively. When the computer is closed, the tongue (13) is located below the pulley (110), as shown by phantom lines in FIG. 2a. In this case, the tongue (13) is limited by the pulley (110) and the pintle (15) is unable to be rotated without an external force.

When the computer is to be opened, the hinge member (14) is pivoted upwards to rotate the pintle (15) and the tongue (13) counter-clockwise. Pushed by the tongue (13), the pulley (110) is rotated clockwise and the pulley bracket (11) is pivoted upwards. After being rotated over the pulley (110), the tongue (13) is disengaged from the pulley (110), and the pulley bracket (11) then is reversedly pivoted to return to the original position by the elastic force of the spring (12). When the computer is to be closed, the hinge member (14) is pivoted downwards to rotate the pintle (15) and the tongue (13) clockwise. Pushed by the tongue (13), the pulley (110) is rotated counter-clockwise and the pulley bracket (11) is pivoted downwards. After the tongue (13) is rotated over the pulley (110) and disengaged from it, the pulley bracket (11) then is reversedly pivoted to return to the original position to limit the tongue (13) again. Thus, the computer can be moved distinctly between the closed first position and the open second position.

Figure 4A:
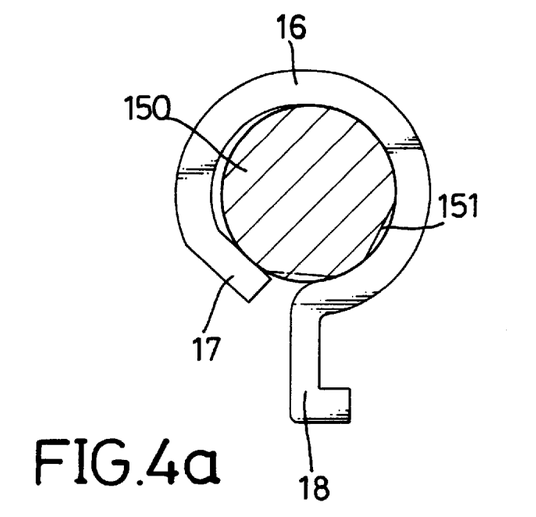
FIG. 4a is a sectional view showing the pintle rotating in the sleeves in opening.
Figure 4B:
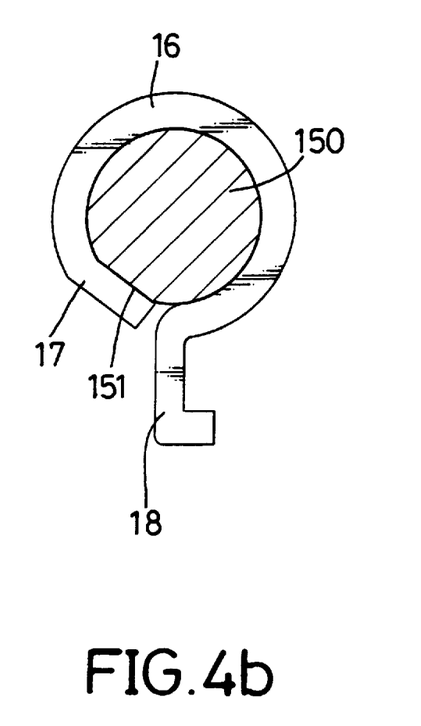
FIG. 4b is a sectional view showing the pintle rotating in the sleeves in closing.

Furthermore, FIG. 4 illustrates a configuration of the pintle (15) being rotated in the sleeves (16) in the open second position of FIG. 4a and the closed first position of FIG. 4b. When the computer is closed, the first chamfer (151) is engaged with the flat distal edge (17) of the sleeve (16), as shown in FIG. 4b. When the computer is opened, the first chamfer (151) is disengaged from the flat distal edge (17), as shown in FIG. 4a. Because of the interference fit between the pintle (15) and the sleeve (16) in the open second position, the sleeve (16) is expanded and generates a holding force on the pintle (15) to grasp it. Thus, the pintle (15) can be freely positioned and the display will not drop. When the computer is moved to the closed second position, the chamfer (150) is engaged with the flat distal edge (17) again. In this case, there is no gap and no holding force between the pintle (15) and the sleeve (16).

Figure 8:
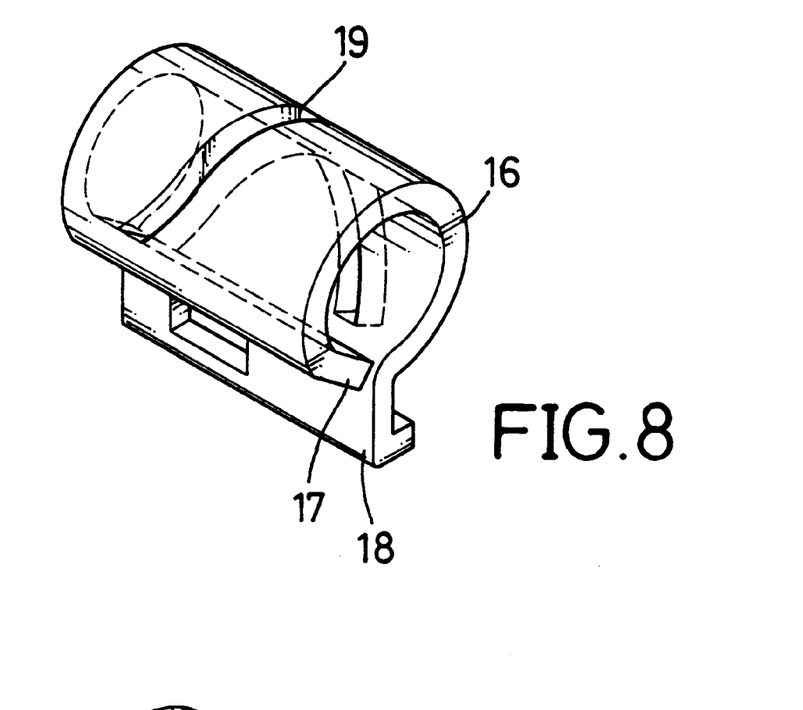
FIG. 8 is a perspective view showing the flexible sleeve with a helical slot for lubrication.
Figure 9:
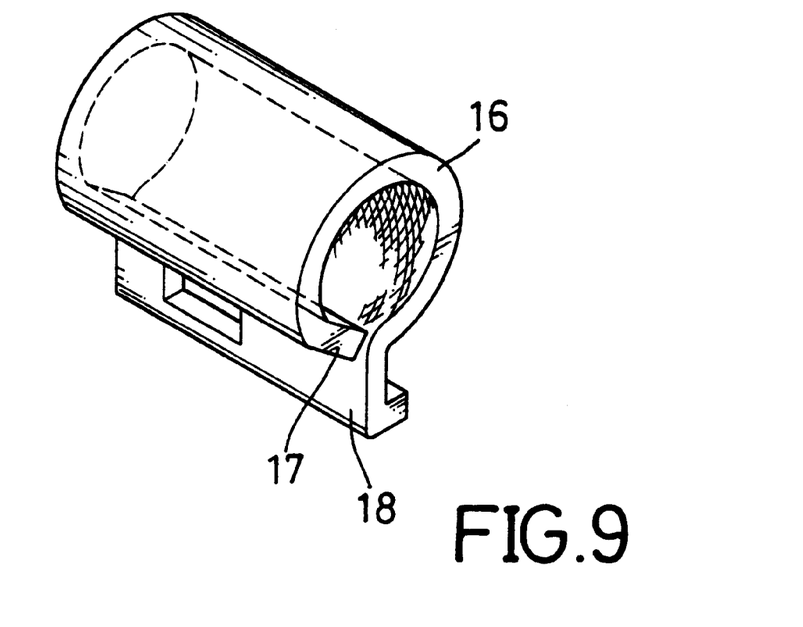
FIG. 9 is a perspective view showing the flexible sleeve with a plurality of meshes for lubricating.

Furthermore, the flexible sleeve (16) has a helical slot (19) defined in the upper portion thereof for receiving lubrication therein, as shown in FIG. 8; or a plurality of meshes for receiving lubrication therein, as shown in FIG. 9.

Figure 5:
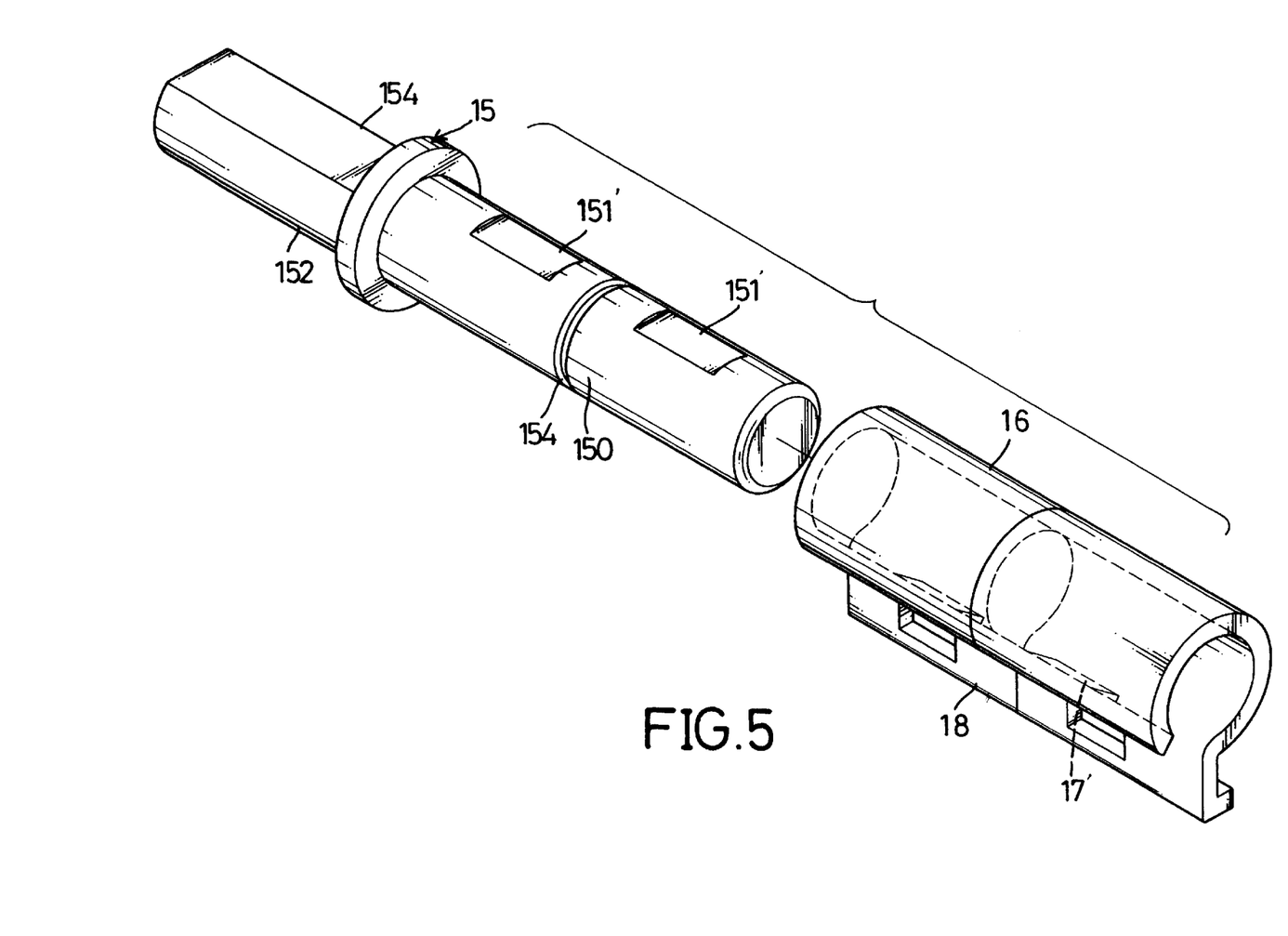
FIG. 5 is an exploded perspective view of a second embodiment of the pintle and the flexible sleeves in accordance with the invention.
Figure 6:
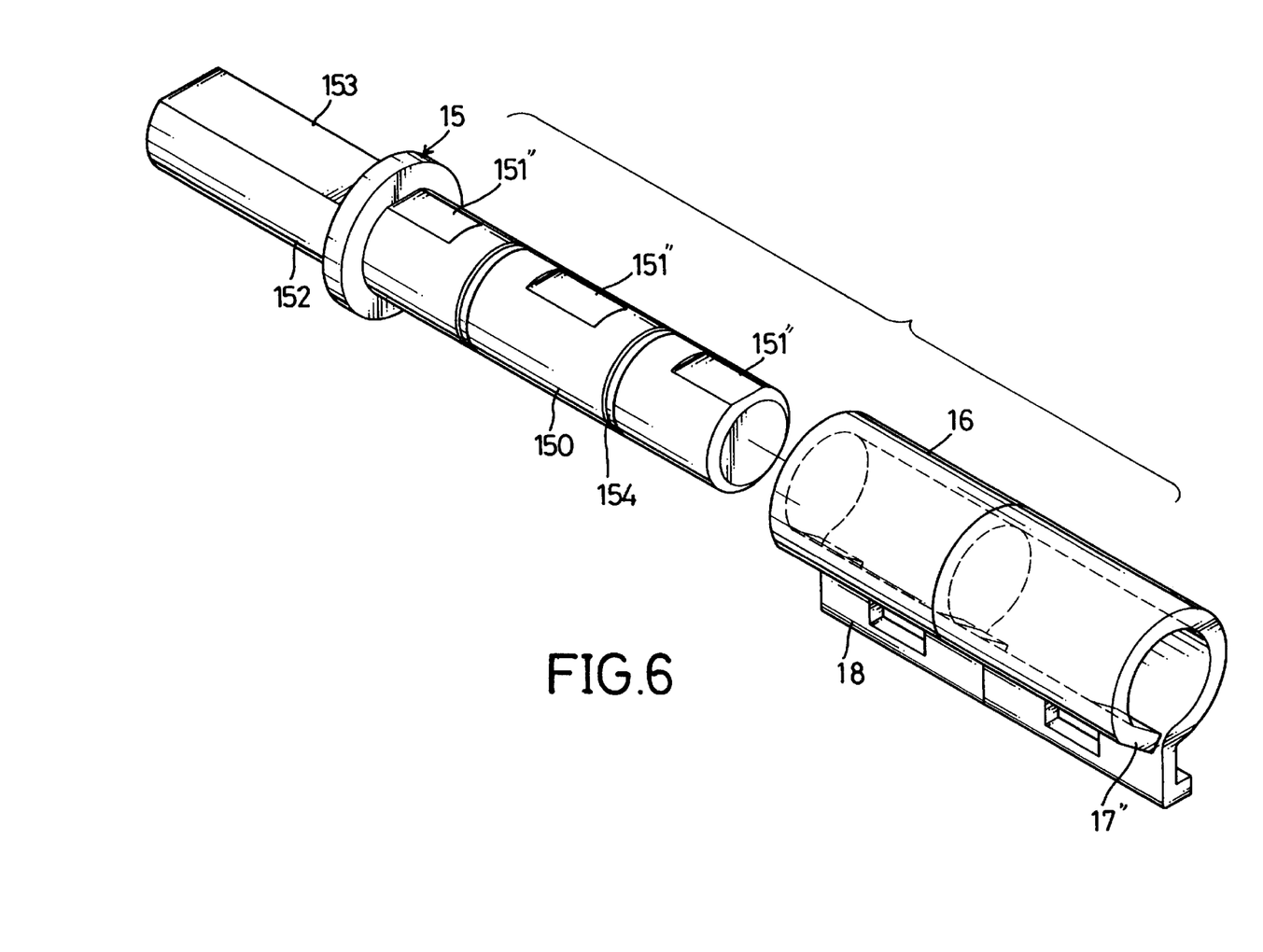
FIG. 6 is an exploded perspective view of a third embodiment of the pintle and the flexible sleeves in accordance with the invention.

Referring to FIG. 5, in a second preferred embodiment of the hinge in accordance with the present invention, the first section (150) of the pintle (15) has two chamfers (151') defined in the outer periphery thereof, and the sleeve (16) has two flat distal edges (17') to correspond to the chamfers (151'). Referring to FIG. 6, in a third preferred embodiment of the present invention, the first section (150) of the pintle (15) has three chamfers (151") defined in the outer periphery thereof, and the sleeve (16) has three flat distal edges (17") to correspond to the chamfers (151").

From the above description, it is noted that the invention has the following advantages:

1. Because the tongue (13) is limited by the pulley (110) and the engagement of the chamfer (151) with the flat distal edges (17), the computer can be securely moved from the open second position to the closed first position without use of other fasteners.
2. When the computer is opened to the second position, the sleeve (16) will generate a holding force to position the display in place.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer comprising:

a base (10) for connecting with a body of a notebook computer, the base having a passage (100) defined therein, a bracket (11) with a pulley (110) provided thereon, pivotally mounted on the base (10), and a spring (12) provided on the base (10) with one end of the spring (12) fixed on the bracket (11), wherein an axis of the passage (100) is parallel to an axis of a rotation of the bracket (11), pivoting about the base (10), and an axis of a rotation of the pulley (110);

a hinge member (14) for connecting to a display of the computer, the hinge member having an opening defined therein;

at least one flexible sleeve (16) securely received;

a pintle (15) having a first section (150) pivotally received in the sleeve (16) in the passage (100), a second section (152) extending through the opening to engage with the hinge member (14), and a flange separating the first section (150) and the second section (152); and a tongue (13) mounted on the second section (152) with a distal portion in contact with the pulley (110).

2. The hinge as claimed in claim 1, wherein the passage (100) further comprises a slot in communication therewith; and the flexible sleeve (16) further comprises a straight lower portion (18), an upper portion shaped as an incomplete circle, and a gap defined between a flat distal edge (17) of the upper portion and the straight lower portion, wherein the straight lower portion is received in the slot to fixedly retain the sleeve (16) in the passage (100).

3. The hinge as claimed in claim 2, wherein the first section (150) of the pintle (15) further comprises a first chamfer (151) axially formed on an exterior periphery thereof and the chamfer (151) matingly abuts an inner face of the flat distal edge (17).

4. The hinge as claimed in claim 1, wherein the first section (150) of the pintle (15) further comprises at least one lubrication groove (154) defined in an exterior periphery thereof.

5. The hinge as claimed in claim 1, wherein the sleeve (16) further comprises at least one helical slot (19) defined in an inner wall thereof.

6. The hinge as claimed in claim 1, wherein the sleeve (16) further comprises a plurality of meshes defined in an inner wall thereof.

7. The hinge as claimed in claim 3, wherein the first chamfer of the first section (150) is composed of a plurality of chamfer segments.

* * * * *